US012569904B2

(12) United States Patent (10) Patent No.: US 12,569,904 B2
De Santis et al. (45) Date of Patent: Mar. 10, 2026

(54) METHOD FOR DETERMINING THE THICKNESS OF A MATERIAL STRIP DURING THE FEED OF THE MATERIAL STRIP TO THE MACHINING ZONE OF A MACHINE TOOL

(71) Applicant: BRUDERER AG, Frasnacht (CH)

(72) Inventors: Ugo De Santis, Roggwil (CH); Herbert Högger, Götzis (AT)

(73) Assignee: BRUDERER AG, Frasnacht (CH)

( * ) Notice: Subject to any disclaimer, the term of this patent is extended or adjusted under 35 U.S.C. 154(b) by 274 days.

(21) Appl. No.: 18/257,309

(22) PCT Filed: Dec. 15, 2020

(86) PCT No.: PCT/EP2020/086188
§ 371 (c)(1),
(2) Date: Jun. 14, 2023

(87) PCT Pub. No.: WO2022/128073
PCT Pub. Date: Jun. 23, 2022

(65) Prior Publication Data
US 2024/0033806 A1 Feb. 1, 2024

(51) Int. Cl.
B21D 43/09 (2006.01)
B21C 51/00 (2006.01)
(Continued)

(52) U.S. Cl.
CPC .............. B21D 43/09 (2013.01); B21C 51/00 (2013.01); B21D 43/22 (2013.01); G01B 5/068 (2013.01); *B21D 28/02* (2013.01)

(58) Field of Classification Search
CPC ........ B21D 43/09; B21D 43/22; B21D 28/02; B21C 51/00; G01B 5/068
USPC ........................................................ 226/152
See application file for complete search history.

(56) References Cited

U.S. PATENT DOCUMENTS 3,540,247 A * 11/1970 Diolot .................... G01B 5/068
72/9.2
5,743,521 A * 4/1998 Munakata .......... G03G 15/5029
271/265.04
(Continued)

FOREIGN PATENT DOCUMENTS

DE 1126830 B * 4/1962 ............. B21D 43/09
DE 3341076 A1 * 7/1984
(Continued)

OTHER PUBLICATIONS

International Search Report mailed on Sep. 2, 2021, in connection with corresponding International Application No. PCT/EP2020/086188 (6 pp., including machine-generated English translation).

*Primary Examiner* — Rakesh Kumar
(74) *Attorney, Agent, or Firm* — McCormick, Paulding & Huber PLLC

(57) ABSTRACT

A method for determining the thickness of a material strip (5) when feeding the material strip (5) to the processing zone of a machine tool (1). The material strip (5) is clamped between two rotatable rollers (3, 4), whose relative position to each other in the original state with clean rollers and "zero" roller spacing was detected (reference relative position) and whose relative position to each other in the intended feed operation is determined for each feed interval (current relative position). The difference between the current relative position and the reference relative position, which gives the thickness of the strip material (5) when the rollers are clean in their original state, is corrected according to the invention for any changes in diameter of the rollers (3, 4) that may have occurred, for example, due to contamination. For this purpose, in the original state with clean rollers (3, 4) in a reference feed operation, an assigned reference angle of rotation of the roller (3) is additionally detected for at least one of the rollers (3) at a detected reference feed
(Continued)

length, so that the original ratio of feed length/angle of rotation for this roller (3) is known and thus its original diameter is also clearly defined. If there are deviations from these parameters during the intended feed operation, the deviations are converted into a diameter change of the at least one roller (3) and taken into account in the calculation of the thickness of the material strip (5). The invention makes it possible to solve today's problems in strip thickness measurements with rollers.

31 Claims, 7 Drawing Sheets

(51) Int. Cl.
B21D 28/02 (2006.01)
B21D 43/22 (2006.01)
G01B 5/06 (2006.01)

(56) References Cited

U.S. PATENT DOCUMENTS 6,070,023 A * 5/2000 Kataoka ............. G03G 15/6514
399/45

6,324,355 B1 * 11/2001 Matsui ............... G03G 15/0194
399/167
10,599,089 B2 * 3/2020 Kasuga ............. H04N 1/00745
10,981,739 B2 * 4/2021 Morikawa ............. B65H 31/02
11,754,956 B2 * 9/2023 Yang ........................ G01B 7/06
399/45

FOREIGN PATENT DOCUMENTS

| | | | | | |
|---|---|---|---|---|---|
| DE | 4125450 | A1 * | 2/1993 | ............. | G01B 5/068 |
| DE | 4125450 | C2 * | 8/1995 | ............... | B42C 1/12 |
| DE | 694 18 136 | T2 | 12/1999 | | |
| DE | 102012111040 | A1 * | 5/2014 | ........ | G03G 15/2028 |
| EP | 0016267 | A1 * | 10/1980 | ............. | B65H 77/00 |
| EP | 0080309 | A3 * | 2/1984 | ............. | G07D 7/183 |
| EP | 650100 | A2 * | 4/1995 | ............. | B65H 43/00 |
| EP | 2 211 138 | A2 | 7/2010 | | |
| GB | 0080309 | A3 * | 11/1982 | ............... | G01B 7/06 |
| JP | H05294511 | A * | 11/1993 | ............... | B65H 1/12 |
| JP | 2911137 | B2 * | 6/1999 | ............... | B65H 7/12 |
| JP | 2012030937 | A * | 2/2012 | ............... | B65H 7/02 |
| JP | 2013030937 | A * | 2/2013 | ........ | H04N 1/00087 |
| WO | WO-2022128073 | A1 * | 6/2022 | ............. | B21C 51/00 |
| WO | WO-2025061263 | A1 * | 3/2025 | ............. | G01B 5/068 |

* cited by examiner

METHOD FOR DETERMINING THE THICKNESS OF A MATERIAL STRIP DURING THE FEED OF THE MATERIAL STRIP TO THE MACHINING ZONE OF A MACHINE TOOL

CROSS-REFERENCE TO RELATED APPLICATION

This application is a National Stage application of International Patent Application No. PCT/EP2020/086188, filed on Dec. 15, 2020, which is hereby incorporated by reference in its entirety.

TECHNICAL FIELD

The present invention relates to a method for determining the thickness of a material strip as the material strip is fed to the processing zone of a machine tool, a roller arrangement for use in carrying out the method, a feed apparatus with the roller arrangement, as well as a machine tool for carrying out the method with such a roller arrangement or feed apparatus in accordance with the preambles of the independent claims.

BACKGROUND

In industrial punching of products from material strips, there are always applications where the exact strip thickness is important.

For example, when punching coins, the thickness of the strip is used to infer the weight of the coin. If the thickness is not correct, the coin is rejected.

In the electric sheet punching process, the sheets are assembled into a package. A small error in the strip thickness leads to large variations in the package height. To control this variation, the thickness is measured. Shortly before the bundle height is reached, a decision is made based on the measurement as to whether the bundle height needs to be corrected. The choice is either to leave the package as it is, to add a sheet or to reduce it by one sheet at the end.

Strip thickness measurement always takes place before the feed. There are various systems and manufacturers for measuring.

The accurate measuring systems have either diamond tips or laser heads. For wide strips, the measurement is not only taken at one point, but the measuring head is moved back and forth across the strip. The average value is then taken to determine the strip thickness. When using coated strips, the diamond tips cannot be used because the coating would be destroyed.

The less accurate systems have rollers. There is a lower fixed roller and an upper movable roller connected to a ram. The upper roller is pressed onto the strip with a defined force. The strip is then clamped between the two rollers. The rollers are moved to one another for calibration (zero). The sheet metal strip is then inserted and the distance by which the upper roll is lifted is determined as the strip thickness. During the production run, the change in strip thickness must then be determined in order to take the correct measures for the package height.

In principle, measurements with rollers are very accurate. Unfortunately, however, they are influenced by external factors, such as dirt or strip coatings. When punching electro-sheets, coated strips are often used. The coating provides an insulation layer between the individual sheets. The better the insulation between the sheets, the better the magnetic field of the motor formed from them. It is therefore important that in this case the coating also remains intact. When measuring with rollers, it is common for small particles of the strip coating to be deposited on the rollers. The build-up on the roller becomes thicker over time. As the particle build-up on the rollers increases, the measurement becomes less accurate. To guarantee a permanently accurate measurement, the rollers would have to be cleaned very often, which is not done in practice.

SUMMARY

The objective is therefore to provide a technical solution that does not have the disadvantages of the prior art described above or at least partially avoids them.

This objective is reached by the subject matter of the independent patent claims.

According to these, a first aspect of the invention relates to a method for determining the thickness of a material strip when feeding the material strip to the processing zone of a machine tool, preferably to the processing zone of an automatic punching machine.

To carry out the method, a roller arrangement is provided with two rollers which can be moved parallel and relative to one another perpendicular to their axes of rotation towards and away from one another, which according to the claims are referred to as the first roller and the second roller. Advantageously, the rollers are displaceable relative to each other perpendicular to their axes of rotation and thus movable toward and away from each other. The term "rollers" according to the claims also includes rollers and other roller elements with a rotationally symmetrical shape, with a width greater than, equal to or smaller than the width of the material strip to be fed.

Before the material strip is fed to the processing zone of the machine tool as intended and the strip thickness is measured, various reference parameters are determined.

On the one hand, the parallel rollers are positioned relative to each other in such a way that the two rollers are in contact (distance "zero"). In this state, the relative position of the rollers to each other is determined as a reference relative position, which can be done in roller arrangements for example with a stationary and a movable roller by determining the absolute position of the movable roller in the stationary system.

On the other hand, the two parallel rollers are spaced apart and a material strip is arranged between them in such a way that the material strip is clamped between the rollers. This material strip can be the material strip to be fed to the processing zone of the machine tool as intended, or it can equally be a material strip that is only used for determining the reference parameters.

The material strip clamped between the rollers is advanced by a certain feed length with slip-free rolling of the rollers on the strip surface. The rollers rotate by a corresponding certain angle of rotation, which includes a section of the roller circumference corresponding to the feed length. The feed length can, but does not have to, correspond to the desired feed length for the intended feeding of the material strip. This feed length is recorded as the reference feed length and the corresponding angle of rotation of the first roller is recorded as the first reference angle of rotation. Alternatively or additionally, the ratio of the determined feed length and the determined angle of rotation of the first roller can also be recorded as a first reference feed length/angle of rotation ratio, which is indicative of the diameter of the roller in the reference state.

After the reference parameters have been acquired, if the material strip to be fed to the processing zone of the machine tool as intended has not already been arranged between the rollers for the determination of the reference parameters, this material strip is arranged between the rollers in such a way that the longitudinal direction of the material strip runs perpendicular to the axes of rotation of the rollers and the material strip is clamped between the rollers.

The material strip clamped between the rollers is now fed to the processing area of the machine tool as intended by being advanced at intervals, with the rollers rotating at intervals by a angle of rotation corresponding to the feed length.

The relative position of the rollers to each other is detected for each feed interval, which can be done for example in roller arrangements with one stationary and one movable roll by determining the absolute position of the movable roller in the stationary system.

In addition, for each feed interval, the angle of rotation of the first roller, the feed length achieved and/or the ratio of the feed length and the angle of rotation of the first roller are recorded.

If the feed length can always be kept exactly constant at a set value, e.g. when using punching tools with pilot pins which are inserted into pilot openings in the material strip at the end of the feed movement, it is not necessary to determine the current feed length in each feed interval and a known set feed length can be used instead.

Then, for each feed interval, the currently detected feed length is compared with the reference feed length (unless a known and precisely maintained set feed length is used as described above), the currently recorded angle of rotation of the first roller is compared with the first reference angle of rotation, and/or the currently detected ratio of the feed length and the angle of rotation of the first roller is compared with the first reference feed length/angle of rotation ratio.

The thickness of the material strip is then calculated from the difference between the reference relative position and the currently determined relative position of the rollers to each other, which corresponds to the distance between the two rollers if the rollers have diameters that are identical to their diameters when the reference relative position was detected.

If the currently detected feed length deviates from the reference feed length, the currently detected angle of rotation of the first roller deviates from the first reference angle of rotation and/or the currently detected ratio of the feed length and the angle of rotation of the first roll deviates from the first reference feed length/angle of rotation ratio, the determined feed length deviation, the determined angle of rotation deviation and/or the determined feed length/angle of rotation ratio deviation is converted via the relationship between the roller diameter, the angle of rotation and the feed length into a possible deviation of the diameter of the first roller from its diameter at detection of the reference relative position and taken into account in the calculation of the thickness of the material strip.

This can be done, for example, by correcting the currently determined relative position of the rollers for the calculation of the thickness of the material strip, taking into account this diameter deviation, or by correcting the thickness of the material strip calculated from the currently determined relative position of the rollers, taking into account this diameter deviation.

The diameter of the first roller when the reference relative position is detected is obtained from the relationship between the roller diameter and the feed length from the reference feed length and the first reference angle of rotation or from the first reference feed length/angle of rotation ratio.

In other words, the invention relates to a method for determining the thickness of a material strip when feeding the material strip to the processing zone of a machine tool, in which method the material strip is clamped between two rotatable rollers, whose relative position to one another was detected in the original state with clean rollers and roller condition "zero" (reference relative position) and whose relative position to one another is detected for each feed interval in the intended feed operation (current relative position). The difference between the current relative position and the reference relative position, which yields the thickness of the strip material when the rollers are clean in the original state, is corrected in accordance with the invention for any changes in the diameter of the rollers, e.g. due to contamination. For this purpose, in the original condition of clean rollers, an associated reference angle of rotation of the roller is detected in advance in a reference feed operation additionally for at least one of the rollers at a detected reference feed length, so that the original feed length/angle of rotation ratio for this roller is known and thus its original diameter is also clearly defined. If deviations from these parameters occur during the intended feed operation, the deviations are converted into a diameter change of the at least one roller and taken into account when calculating the thickness of the material strip.

The invention makes it possible to solve the problems described at the beginning for strip thickness measurements with rollers.

Preferably, any change in diameter of the second roller is also taken into account when calculating the thickness of the material strip.

In a first preferred variant, this is done in the same way as for the first roller. When determining the reference parameters, a second reference angle of rotation and/or a second reference feed length/angle of rotation ratio is also recorded for the second roller.

Then, for each feed interval, additionally the angle of rotation of the second roller is compared with the second reference angle of rotation and/or the ratio of the feed length/angle of rotation ratio of the second roller is compared with the second reference feed length/angle of rotation ratio. In the event that the currently detected rotation angle of the second roll deviates from the second reference rotation angle and/or the currently detected feed length/angle of rotation ratio of the second roller deviates from the second reference feed length/angle of rotation ratio, the determined angle of rotation deviation of the second roller and/or or the determined feed length/angle of rotation ratio is converted via the relationship between the roller diameter, the angle of rotation and the feed length into a possible deviation of the diameter of the second roller from its diameter at detection of the reference relative position and is taken into account when calculating the thickness of the material strip.

This can be done, for example, by correcting the currently determined relative position of the rollers for the calculation of the thickness of the material strip taking this diameter deviation into account, or by correcting a thickness of the material strip calculated from the currently determined relative position of the rollers taking this diameter deviation into account.

The diameter of the second roller when the reference relative position is detected is determined by the relationship between the roller diameter and the feed length from the reference feed length and the second reference angle of rotation or from the second reference feed length/angle of rotation ratio. In this way, a particularly accurate strip thickness measurement can be reached.

In a second preferred variant, the diameter of the second roller is assumed to change identically to the diameter of the first roller during operating time.

If it is determined that the currently detected feed length deviates from the reference feed length, the currently detected angle of rotation of the first roller deviates from the first reference angle of rotation and/or the currently detected feed length/angle of rotation ratio of the first roller deviates from the first reference feed length/angle of rotation ratio, and therefore the determined feed length deviation, the determined angle of rotation deviation and/or the determined feed length/angle of rotation ratio deviation via the relationship between the roller diameter, the angle of rotation and the feed length recalculated into a possible deviation of the diameter of the first roller from its diameter when the relative position is detected, it is assumed that the roller diameter of the second roller has an identical deviation from its diameter at detection of the reference relative position, and when calculating the thickness of the material strip, not only the calculated diameter deviation of the first roller is taken into account, but also the assumed diameter deviation of the second roller.

This can be done, for example, by correcting the currently determined relative position of the rollers for the calculation of the thickness of the material strip taking into account these diameter deviations or by correcting a thickness of the material strip calculated from the currently determined relative position of the rollers taking into account these diameter deviations.

In this way, a relatively accurate strip thickness measurement can be reached with less technical effort than with the first variant.

In a preferred embodiment of the method, the axis of rotation of one of the rollers, preferably the second roller according to the claims, is stationary (fixed) and the axis of rotation of the other roller is shiftable or pivotable (movable) perpendicular to the axis of rotation and substantially perpendicular to the direction of travel of the material strip. This allows relatively simple devices to be used for carrying out the method.

In a further preferred embodiment of the method, at least one of the rollers is driven and both rollers together serve to advance the material strip at intervals. The rollers with which the strip thickness measurement is carried out are thus simultaneously the feed rollers of a strip feed device. In this way, the technical equipment required can be kept as small as possible and compact solutions are possible.

In yet another preferred embodiment of the method, the position of the outer surface of at least one of the rollers facing away from the strip material is determined for the detection of the relative positions of the rollers with respect to each other, and advantageously at least of the first roller according to the claims. This outer surface is typically easily accessible and a change in the diameter of the roller due to deposits can thus be detected 1:1 as a change in the relative position of this outer surface of the roller.

In another preferred embodiment of the method, the position of a body connected to the bearing of at least one of the rollers, preferably a body connected to the bearing of the first roller, is determined for the detection of the relative positions of the rollers with respect to each other. The position of such components can be determined very reliably and a change in the radius of the roller due to deposits can thus be detected 1:1 as a change in the position of these components. Accordingly, the change in the diameter of the roller due to deposits is twice as large as the change in the position of these components.

In the two previously mentioned embodiments, it is advantageous that one or more non-contact distance measuring sensors are used to determine the position of the outer surface of the respective roller facing away from the strip material or of the body connected to the bearing of the respective roll, preferably eddy current sensors, capacitive sensors or laser measuring devices, in particular confocal laser measuring systems. Such sensors are available at low cost and enable highly precise position determination.

In the two aforementioned embodiments, it is also advantageous that the position of the outer surface of the respective roller facing away from the strip material or the body connected to the bearing of the respective roller is determined at several points, preferably in the area of the two ends of the respective roller. This makes it possible to determine the position particularly precisely.

In yet another preferred embodiment of the method according to the invention, the material strip is provided with piloting openings and the position of a piloting opening is determined in each case to detect the feed length of the strip material. This is done advantageously by means of a line sensor. In this way, it is possible to determine the feed length with high precision.

It is further preferred that the method is used in a punch press, wherein the material strip, the thickness of which is determined, is fed to a tool for the production of sheet stacks and wherein the determined strip thicknesses are used to determine the stack height. The advantages of the invention become particularly apparent in such applications of the process.

A second aspect of the invention relates to a roller arrangement for use in carrying out the method according to the first aspect of the invention.

The roller arrangement comprises at least one pair of rollers between which the material strip can be clamped, as well as devices for detecting the relative position of the rollers to each other and the rotation angle of at least one of the rollers. The term "rollers" according to the claims also includes rollers and other rolling elements with a rotationally symmetrical shape, with a width greater than, equal to or smaller than the width of the material strip to be fed.

The implementation of the process according to the invention is significantly simplified with such roller arrangements.

In a preferred embodiment, the roller arrangement comprises at least one pair of rollers between which the material strip can be clamped and with which it can be advanced at intervals by rotating the rollers. These are therefore so-called feed rollers. Furthermore, the roller arrangement comprises devices with which the relative position of the rollers to each other and the angle of rotation of at least one of the rollers can be detected for each feed interval. With such roller arrangements, the implementation of the process according to the invention is significantly simplified, in particular for punch presses.

Advantageously, the devices for detecting the relative position of the rollers are designed for determining the position of the outer surface of at least one of the rollers facing away from the material strip or for determining the position of a body connected to the bearing of at least one of the rollers. Hereby a relatively simple and reliable quantitative determination of a change of the diameter or the radius of the roller due to deposits becomes possible.

It is also preferred that the devices for determining the position of the outer surface of the respective roller facing away from the strip material and/or of the body connected to the bearing of the respective roller have one or more non-contact distance measuring sensors, preferably eddy current sensors, capacitive sensors or laser measuring devices, especially confocal laser measuring systems. Such sensors are available at low cost and enable high-precision position determination.

Preferably, the devices for detecting the relative position of the rollers to each other are designed in such a way that the determination of the position of the outer surface of the respective roller facing away from the strip material and/or the body connected with the bearing of the respective roller can be carried out at several points, advantageously in the area of the two ends of the respective roller. This makes it possible to determine the position particularly precisely.

A third aspect of the invention relates to a feed apparatus having a roller arrangement according to the second aspect of the invention.

A fourth aspect of the invention relates to a machine tool for carrying out the method according to the first aspect of the invention, comprising a roller arrangement according to the second aspect of the invention or a feed apparatus according to the third aspect of the invention.

It is preferred that the machine tool is a punching press with a die for the production of stacks of sheet metal.

The advantages of the invention are particularly evident in such machine tools.

BRIEF DESCRIPTION OF THE DRAWINGS

Further preferred embodiments of the invention are apparent from the dependent claims and from the description which now follows with reference to the figures. It is shown in:

DETAILED DESCRIPTION

Figure 1:
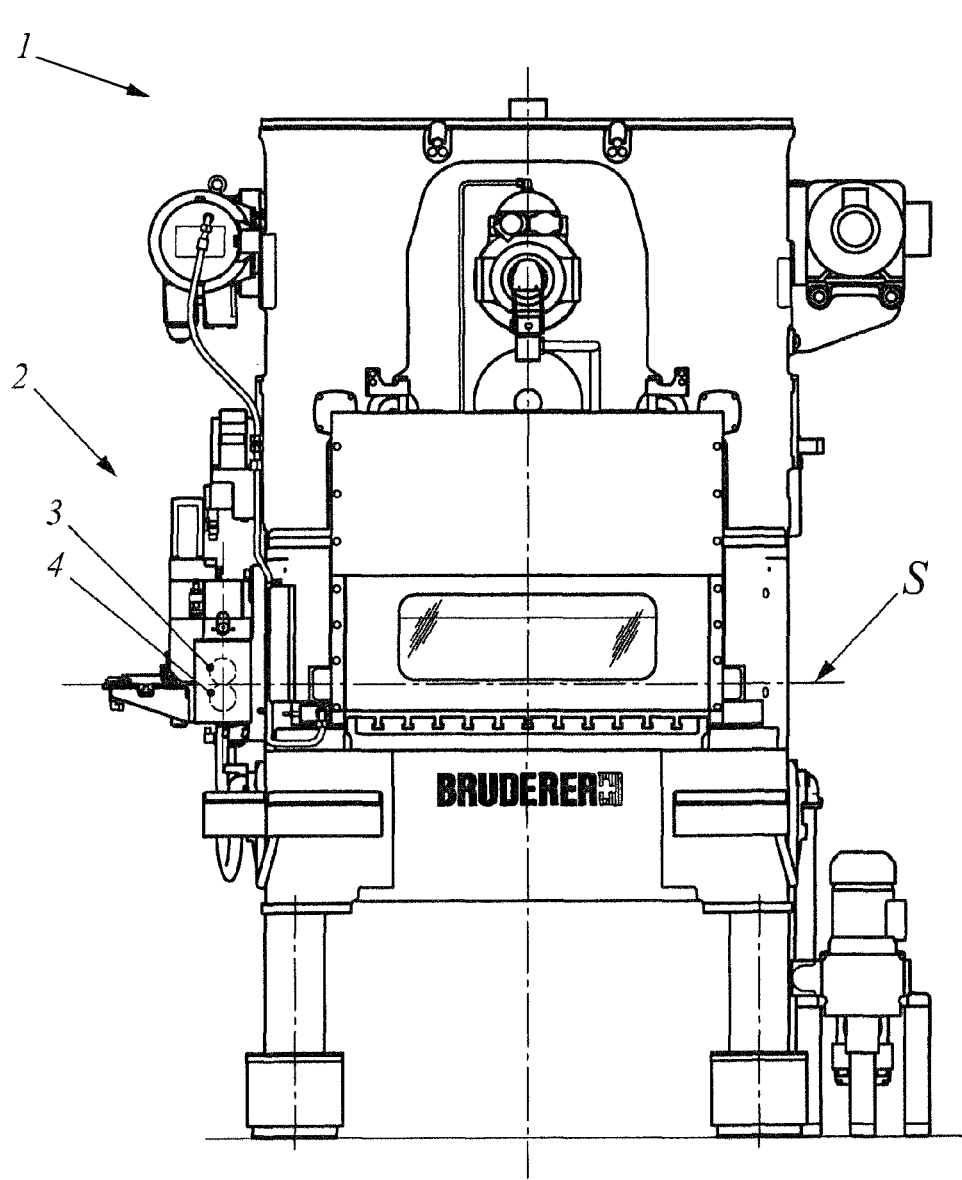
FIG. 1 a front view of a punching press for processing strip material.

FIG. 1 shows the front view of a punching press 1 for processing strip material into stacks of electro-sheets.

As can be seen, the punching press 1 has on its infeed side a feed apparatus 2 with a roller arrangement comprising an upper feed roller 3 and a lower feed roller 4, by means of which the strip material (not shown) is fed in the strip running plane S to the processing zone of the punching press 1.

Figure 2:
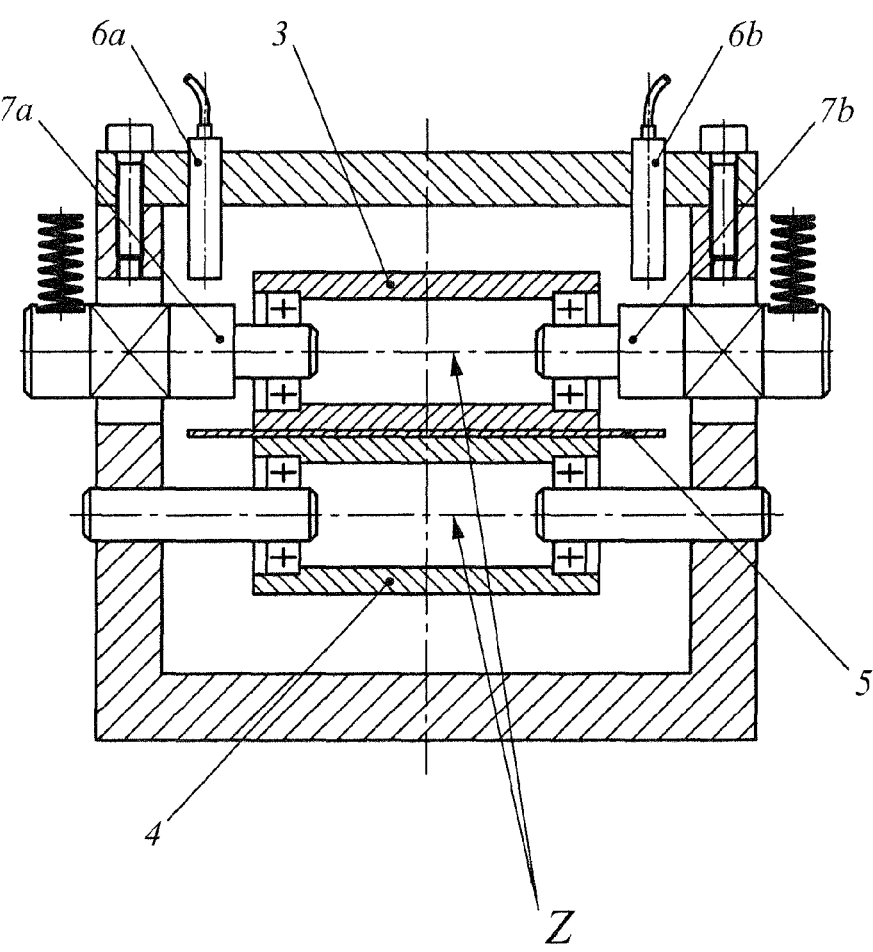
FIG. 2 a vertical section through a roller arrangement for determining the strip thickness according to the prior art.

FIG. 2 shows a vertical section through a roller arrangement of a feed apparatus in which the strip thickness is determined according to the prior art as described at the beginning.

In the situation shown here, the material strip 5 is arranged between the lower fixed roller 4 and the upper movable roller 3 of the feed apparatus, whereby the upper roller 3 is pressed onto the strip 5 with a defined force so that the strip 5 is clamped between the two rollers 3, 4. The distance measuring sensors 6a, 6b are used to determine the position of the bearing journals 7a, 7b of the movable upper roller 3, namely for calibration without material strip 5 with rollers 3, 4 resting on one another and then with material strip 5 arranged between the rollers 3, 4, as shown here in FIG. 2. The position determined with the rollers 3, 4 resting on one other thus embodies a relative position of the rollers to one another with the strip thickness "zero", and the position determined with the material strip arranged between the rollers 3, 4 embodies a relative position of the rollers 3, 4 to one another which represents the current strip thickness. The difference between the determined positions or the relative positions of the rollers 3, 4 to each other is determined as the strip thickness, with the problems mentioned at the beginning in the case of a change of the roller diameters due to contamination.

Figure 3:
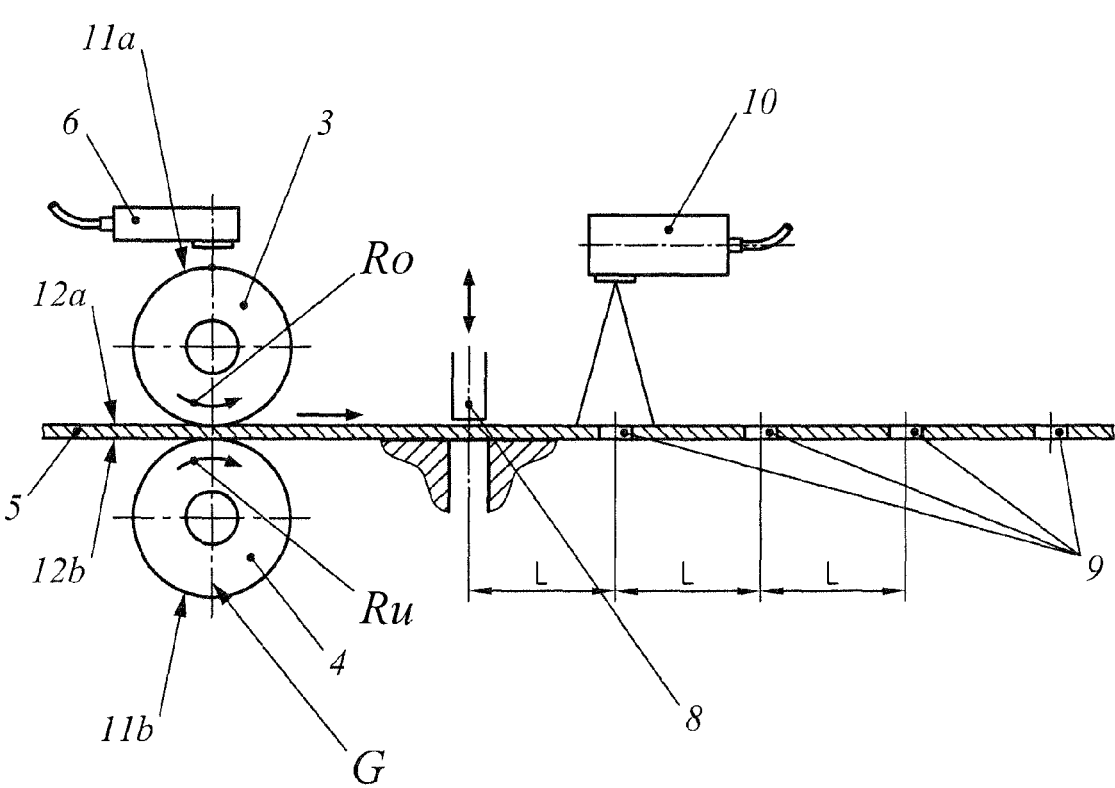
FIG. 3 a principle sketch explaining a preferred embodiment of the method according to the invention.

FIG. 3 shows a principle sketch explaining a preferred embodiment of the method according to the invention for determining the thickness of a material strip 5 when feeding the material strip 5 to the processing zone of a machine tool.

To carry out the method, two rollers 3, 4 of a roller arrangement are provided which can be moved parallel and relative to each other perpendicular to their axes of rotation towards and away from each other. The axes of rotation of the rollers 3, 4 run horizontally and the rollers 3, 4 are arranged vertically above one another, resulting in an upper roller 3 and a lower roller 4. The rollers 3, 4 have an identical roller diameter.

Prior to the intended feeding of the material strip to the processing zone of the machine tool, which is shown in FIG. 3, and the measurement of the strip thickness, various reference parameters are determined.

Firstly, the rollers 3, 4 are positioned relative to each other in such a way that their outer surfaces 11a, 11b are in contact. In this state, the relative position of the rollers 3, 4 to each other is determined as the relative reference position. For this purpose, a non-contact distance measuring sensor 6 in the form of a laser measuring device is provided, with which the position of the outer surface 11a of the upper roller 3 facing away from the strip material 5 is determined by measuring the distance between the sensor 6 and the outer surface 11a of the upper roller 3 along a straight line G which runs through the axes of rotation of both rollers 3, 4. In the present case, the axis of rotation of the lower roller 4 and the sensor 6 are stationary (fixed), so that for this reference measurement with the rollers 3, 4 in the clean initial state, the distance measured with the sensor 6 to the outer surface 11a of the upper roller 3 represents a relative position of the rollers 3, 4 to one another at a roller spacing of "zero".

On the other hand, the rollers 3, 4 are spaced apart from each other and a material strip 5 is arranged between them in such a way that the material strip 5 is clamped between the rollers 3, 4. In the present case, this material strip 5 is the material strip 5 to be fed to the processing area of the machine tool as intended. However, another material strip can also be used for determining the reference parameters.

The material strip 5 clamped between the rollers 3, 4 is advanced by a certain feed length L with slip-free rolling of the rollers 3, 4 on the strip surface 12a, 12b. The rollers 3, 4 rotate through a corresponding specific angle of rotation Ro, Ru, which includes a section of the roller circumference corresponding to the feed length L. In the present case, this reference feed length corresponds to the desired feed length L when the material strip is fed as intended. However, a different feed length can also be selected for determining the reference parameters. This feed length L is recorded as the reference feed length and the corresponding angle of rotation Ro of the upper roller 3 is recorded as the reference angle of rotation.

After the reference relative position of the rollers 3, 4 to each other at a roller spacing of "zero" as well as the reference feed length and the associated reference angle of rotation have been determined in the clean original state of the rollers 3, 4, the material strip 5 clamped between the rollers 3, 4 is fed as intended to the processing area of the machine tool by being advanced by the desired feed length L at intervals. This situation is sketched in FIG. 3.

When the material strip 5 is advanced at intervals, the rollers 3, 4 roll slip-free on the strip surface and rotate accordingly at intervals by an angle of rotation Ru, Ro corresponding to the feed length L, when the material strip 5 is advanced at intervals.

In the feed pause between two feed intervals, the material strip 5 is punched with the punching machine. In each case, a pilot opening 9 is made in the material strip 5 with a stationary punching tool 8, which is used to determine the current feed length L in the following feed interval. For this purpose, a line sensor 10 is provided, with which the position of the last pilot opening 9 is determined in each case to detect the feed length L of the strip material 5. The feed length L corresponds to the distance between the known position of the pilot opening 9 when it is created with the punching tool 8 and the position of the pilot opening 9 determined by the line sensor 10 after the strip material 5 has been advanced.

Also, in the intended feed operation, the relative position of the rollers 3, 4 to each other is detected with the sensor 12 for each feed interval, as well as the angle of rotation Ro of the upper roller 3. Last mentioned is done via an angle encoder on the shaft of the upper roller 3 (not shown).

For each feed interval, the currently detected feed length L is then compared with the reference feed length and the currently detected angle of rotation Ro of the upper roller 3 is compared with the reference angle of rotation.

The thickness of the material strip is then calculated from the difference between the reference relative position and the relative position of the rollers 3, 4 to each other currently determined with the sensor 6 or from the difference between the distances between the sensor 6 and the surface 11a of the upper roller 3 during the reference measurement and during the current measurement, which difference corresponds to the distance between the two rollers 3, 4 and thus to the strip thickness, provided that the current diameters of the rollers 3, 4 are identical to their diameters in the clean original state when the reference parameters were recorded.

If the currently detected feed length L deviates from the reference feed length and/or the currently detected angle of rotation Ro of the upper roller 3 deviates from the reference angle of rotation, it is assumed that the diameter of both rollers 3, 4 has changed since the reference relative position was determined, and in an identical manner for both rollers 3, 4.

In this case, the determined feed length deviation and/or the determined angle of rotation deviation is converted via the relationship between the roller diameter, the angle of rotation and the feed length into a possible deviation, in particular increase, of the diameter of the upper roller 3 from its diameter when the reference relative position was detected, and the theoretical strip thickness calculated from the difference between the reference relative position and the relative position of the rollers 3, 4 currently determined with the sensor 12 is corrected by the diameter deviation.

The diameter of the upper roller 3 when the reference relative position was detected is determined by the relationship between the roller diameter and the feed length from the reference feed length and the reference angle of rotation. The diameter of the lower roller 4 was identical to that of the upper roller 3 at the time the reference relative position was detected.

It is further assumed that the lower roller 4 has experienced an identical diameter deviation, in particular diameter increase, and the theoretical strip thickness calculated from the difference between the reference relative position and the relative position of the rollers 3, 4 currently determined with the sensor 6 is corrected by half the diameter deviation of the upper roller 3 in addition to taking into account this assumed diameter deviation of the lower roller 4. This is because the lower fixed roller 4 is arranged below the material strip 5 and an increase in diameter of this roller 4 contributes only half to a change in the position of the upper roller 3.

The theoretic strip thickness calculated from the difference between the reference relative position and the relative position of rollers 3, 4 currently determined by sensor 12 is therefore corrected by one and a half times the diameter deviation of the upper roller 3. This is illustrated with figures using the following example:

When determining the reference parameters, a distance between the outer surface 11a of the upper roller 3 and the distance measuring sensor 6 of 32 mm was determined as the reference relative position of the rollers 3, 4 to each other (roller distance "zero"). In addition, a reference feed length of 31.42 mm was determined with a reference angle of rotation of the upper roller 3 of 90 degrees. From these values, it can be readily calculated via the relationship between the roller diameter, the angle of rotation and the feed length that the diameter of the upper roller 3 was 40 mm at the time the reference relative position was determined.

For the feed interval considered in the intended feed operation, a rotation angle Ro of the upper roller of 90 degrees, a feed length L of 31.49 mm and a current relative position of the rollers 3, 4 with a distance between the outer surface 11a of the upper roller 3 and the distance measuring sensor 6 of 32 mm were determined.

Accordingly, the currently determined feed length L is 0.07 mm greater than the reference feed length and the difference between the reference relative position and the currently determined relative position of rollers 3, 4 is 0.415 mm. This difference corresponds to the strip thickness in the event that the diameters of the two rollers 3, 4 would currently be identical to their diameters when the reference relative position was determined (theoretical strip thickness).

However, the relationship between the roller diameter, the angle of rotation and the feed length results in an actual roller diameter of the upper roller 3 of 40.1 mm, i.e. an increase in diameter of 0.1 mm compared to the reference condition. In addition, it is assumed that the diameter of the lower roller 4 has also changed to the same extent, i.e. it has also increased by 0.1 mm.

In order to take these diameter deviations into account when calculating the thickness of the material strip 5, for the upper roller 3 its diameter increase of 0.1 mm and for the lower roller half of its assumed diameter increase, i.e. 0.05 mm, is now subtracted from the theoretical strip thickness of 0.415 mm, resulting in a correspondingly corrected actual strip thickness of mm.

Figure 4:
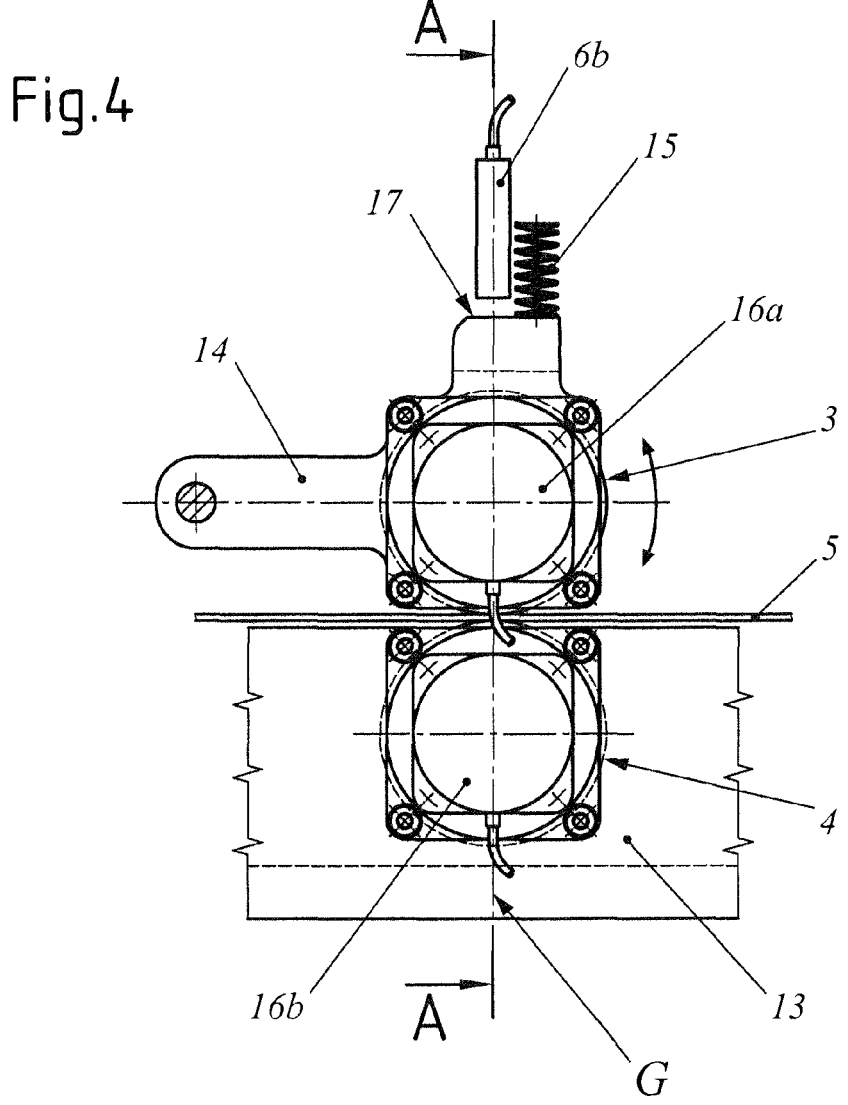
FIG. 4 a side view of a first roller arrangement according to the invention.
Figure 5:
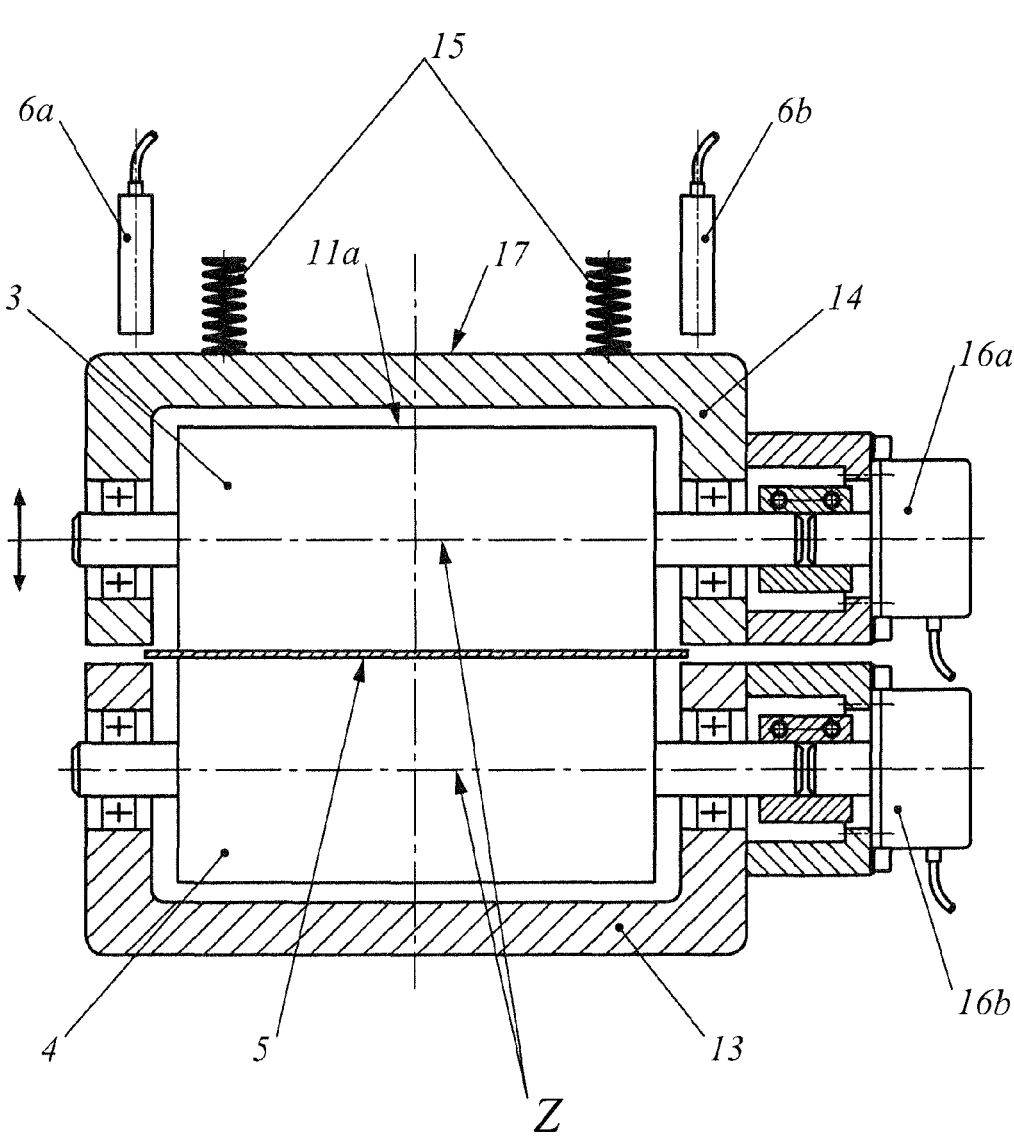
FIG. 5 a vertical section along line A-A in FIG. 4.

FIGS. 4 and 5 show a roller arrangement according to the invention for use in carrying out a further preferred embodiment of the method according to the invention, once in side view (FIG. 4) and once in vertical section along line A-A in FIG. 4 (FIG. 5).

This roller arrangement comprises two parallel rollers 3, 4, an upper roller 3 and a lower roller 4, between which the material strip 5 is clamped. The rollers 3, 4 are identical and the lower roller 4 is mounted in a fixed structure 13, while the upper roller 3 is mounted in a rocker 14 so that it can be pivoted relative to the lower roller 4. Since at it is urged towards the lower roller 4 by gravity and the force of two springs 15, the material strip 5 is clamped between the rollers 3, 4 with a certain compressive force.

Angle of rotation encoders 16*a*, 16*b* are arranged at the ends of the bearing shafts of the rollers 3, 4 for monitoring the angle of rotation of the rollers 3, 4 in order to determine the angle of rotation of the rollers 3, 4.

On the upper side of the rocker 14, directly above the axis of rotation of the upper roller 3, in the area of the ends of the upper roller 3, two fixed distance measuring sensors 6*a*, 6*b* are arranged at a distance from the upper side 17 of the rocker 14, with which the distance between the respective sensor 6*a*, 6*b* and the upper side 17 of the rocker 14 can be measured along a straight line G through the axes of rotation of the rollers 3, 4, for the purpose of determining the relative position of the rollers 3, 4 to one another.

Except for the deviations explained below, the determination of the thickness of the material strip 5 when using this roller arrangement is carried out in an analogous manner to the method described based on FIG. 3.

In the present case, both rollers 3, 4 have an angle of rotation encoder 16*a*, 16*b*, which is why the diameter deviation of the lower roller 4 is carried out here in the same way as for the upper roller 3, i.e. separate reference angles of rotation are recorded for both rollers 3, 4 and then separate current angles of rotation are recorded for each feed interval, with which the diameter deviations of the rollers 3, 4 are then calculated separately.

Since for the detection of the relative positions of the rollers to each other with the distance measuring sensors 6*a*, 6 not, as in FIG. 3, the position of the outer surface 11*a* of the upper roller 3 facing away from the strip material 5 is determined, but the position of the upper side of the rocker 14, i.e. the position of a body connected to the bearing of the upper roller 3, the theoretical strip thickness calculated from the difference between the reference relative position of the upper roller 3 and the relative position of the rollers 3, 4 currently determined by the sensors 6*a*, 6*b* is only corrected by half of the determined diameter deviation of the upper roller 3. This is because in this situation an increase in diameter of this roller 3 contributes only half to a change in the position of the top of the rocker 14. The distances measured with the sensors 6*a*, 6*b* are averaged.

As already explained for FIG. 3, only half of the diameter deviation of the fixed lower roller 4 is used for the correction of the theoretical strip thickness. In the present case, this is therefore corrected by half the diameter deviation of the upper roller 3 and by half the diameter deviation of the lower roller 4.

Figure 6:
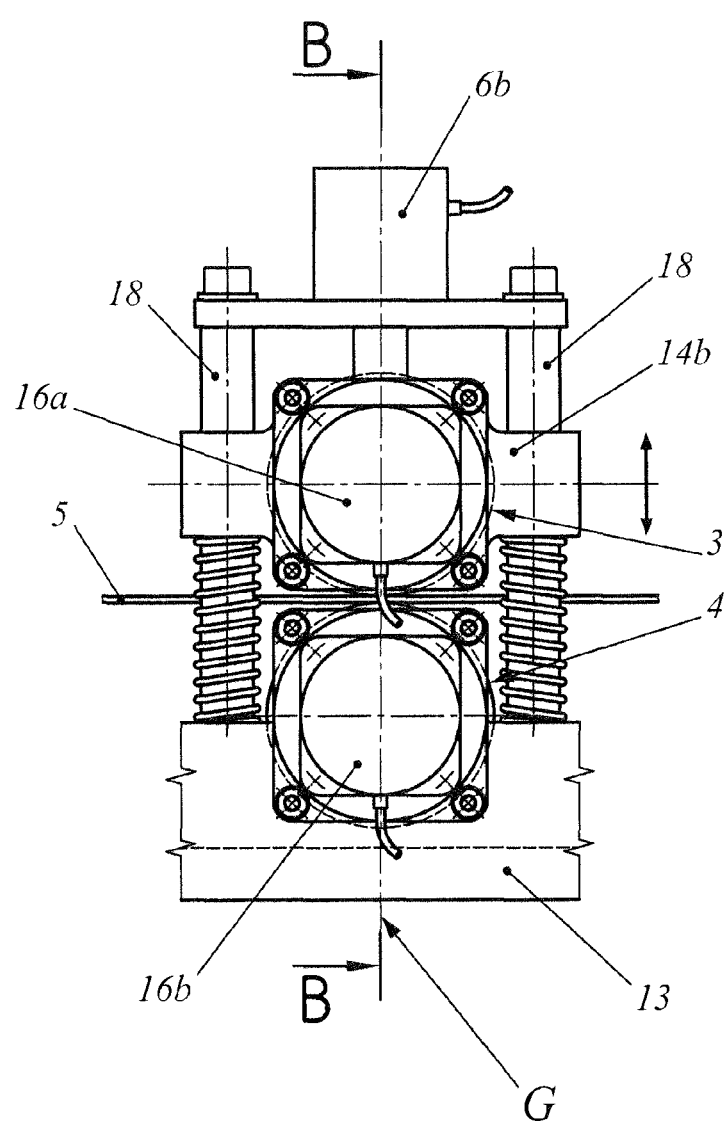
FIG. 6 a side view of a second roller arrangement according to the invention.
Figure 7:
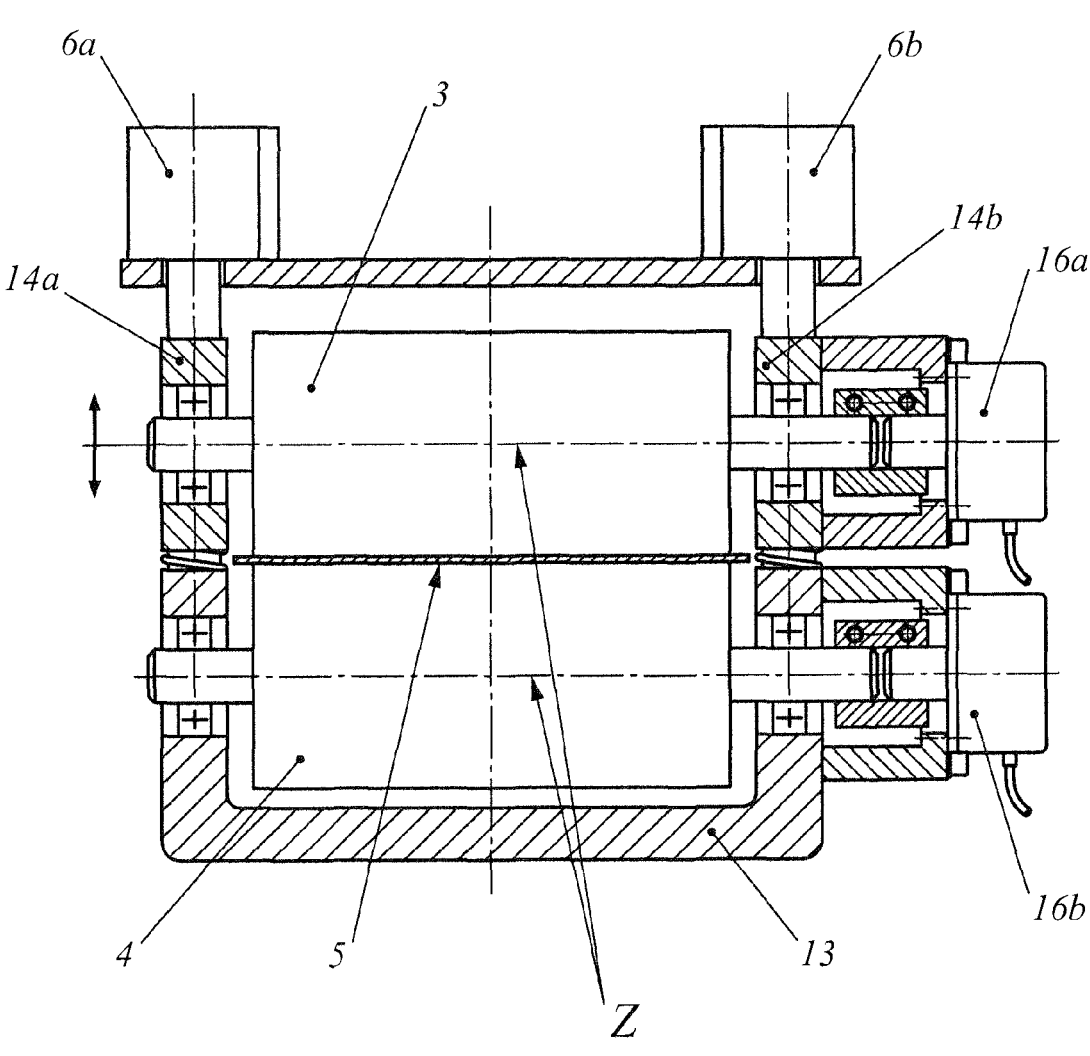
FIG. 7 a vertical section along line B-B in FIG. 6.

FIGS. 6 and 7 show a further roller arrangement suitable for use in carrying out yet another preferred embodiment of the method according to the invention, once in side view (FIG. 6) and once in vertical section along the line B-B in FIG. 6 (FIG. 7).

This roller arrangement differs from the one shown in FIGS. 4 and 5 essentially in that the upper roller 3 is not pivotably mounted in a rocker, but is vertically displaceable along linear guides. The distance gauges 6*a*, 6*b*, which are not designed to be non-contacting here, measure directly on the bearing housings 14*a*, 14*b* of the bearing of the upper roller 3.

Otherwise, the technical concept here is similar to that shown in FIGS. 4 and 5, and components of the same function are given the same reference numerals here as in FIGS. 4 and 5.

The method according to the invention carried out with this roller arrangement corresponds to the procedure described based on FIGS. 4 and 5.

While preferred embodiments of the invention are described in the present application, it should be clearly noted that the invention is not limited to these and may be carried out in other ways within the scope of the claims which now follow.

What is claimed is:

1. A method for determining the thickness of a material strip when feeding the material strip to the processing area of a machine tool comprising the steps:

a) Providing a roller arrangement with two rotatable rollers, the two rotatable rollers including a first roller and a second roller, wherein axes of rotation of the two rollers are parallel and the rollers are movable perpendicular to their axes of rotation relative to one another;

b) Positioning the rollers relative to each other such that the two rollers are in contact with each other, and detecting in this state a relative position of the rollers to each other as a reference relative position;

c) Arranging a material strip between the rollers such that the longitudinal direction of the material strip runs perpendicular to the axes of rotation of the rollers and the material strip is clamped between the rollers;

d) Advancing the material strip clamped between the rollers by a specific feed length with slip-free rolling of the rollers on a strip surface, wherein the rollers perform a rotation by a specific angle of rotation corresponding to the specific feed length;

e) Detecting the determined feed length as a reference feed length and the determined angle of rotation of the first roller as a first reference angle of rotation and/or detecting a ratio of the determined feed length and the determined angle of rotation of the first roller as a first reference feed length/angle of rotation ratio;

and afterwards:

f) if not already carried out under point c), arranging the material strip provided for an intended feeding to the processing zone of the machine tool between the rollers such that the longitudinal direction of the material strip runs perpendicular to the axes of rotation of the rollers and the material strip is clamped between the rollers;

g) Advancing at intervals the material strip clamped between the rollers, in each case by a feed length, wherein the rollers perform a rotation at intervals by an angle of rotation;

h) Detecting for each feed interval the relative position of the rollers to one another and the angle of rotation of the first roller and the feed length, or detecting for each feed interval the relative position of the rollers to one another and the angle of rotation of the first roller and the ratio of the feed length and the angle of rotation of the first roller;

i) Comparing for each feed interval a currently detected feed length with the reference feed length, a currently detected angle of rotation of the first roller with the first reference angle of rotation, and/or a currently detected ratio of the feed length and the angle of rotation of the first roller with the first reference feed length/angle of rotation ratio;

j) Calculating for each feed interval the thickness of the material strip from the difference between the reference relative position and the currently determined relative position of the rollers to each other, wherein, in the event that the currently detected feed length deviates from the reference feed length, the currently detected angle of rotation of the first roller deviates from the first reference angle of rotation and/or the currently detected ratio of the feed length and the angle of rotation of the first roller deviates from the first reference feed length/angle of rotation ratio, the determined feed length deviation, the determined angle of rotation deviation and/or the determined feed length/angle of rotation ratio deviation is converted via the relationship between the roller diameter, the angle of rotation and the feed length into a deviation of the diameter of the first roller from its diameter at detection of the reference relative position and is taken into account in the calculation of the thickness of the material strip.

2. The method according to claim 1, wherein in step e), in an analogous manner as for the first roller, a second reference angle of rotation and/or a second reference feed length/angle of rotation ratio is detected also for the second roller, for each feed interval, additionally the angle of rotation of the second roller is compared with the second reference angle of rotation and/or the ratio of the feed length and the angle of rotation of the second roller is compared with the second reference feed length/angle of rotation ratio, and in the case that the currently detected angle of rotation of the second roller deviates from the second reference angle of rotation and/or the currently detected ratio of the feed length and the angle of rotation of the second roller deviates from the second reference feed length/angle of rotation ratio, the determined angle of rotation deviation of the second roller and/or the determined feed length/angle of rotation ratio is converted via the relationship between the roller diameter, the angle of rotation and the feed length into a deviation of the diameter of the second roller from its diameter at detection of the reference relative position and is taken into account when calculating the thickness of the material strip.

3. The method according to claim 1, wherein for the case, that the currently detected feed length deviates from the reference feed length, the currently detected angle of rotation of the first roller deviates from the first reference angle of rotation and/or the currently detected ratio of the feed length and the angle of rotation of the first roller deviates from the first reference feed length/angle of rotation ratio and the determined feed length deviation, the determined angle of rotation deviation and/or the determined feed length/angle of rotation ratio deviation is converted via the relationship between the roller diameter, the angle of rotation and the feed length into a deviation of the diameter of the first roller from its diameter at detection of the reference relative position, it is assumed that the roller diameter of the second roller has an identical deviation from its diameter at detection of the reference relative position and this assumed deviation is taken into account when calculating the thickness of the material strip.

4. The method according to claim 1, wherein the axis of rotation of one of the rollers is stationary and the axis of rotation of the other roller is shiftable perpendicularly to the axis of rotation and perpendicularly to the direction of passage of the material strip.

5. The method according to claim 1, wherein at least one of the rollers is driven and the two rollers effect the feed of the material strip.

6. The method according to claim 1, wherein the position of the outer surface facing away from the material strip of at least one of the rollers is determined for the detection of the relative positions of the rollers to one another.

7. The method according to claim 6, wherein one or more non-contact distance measuring sensors are used for determining the position of the outer surface facing away from the material strip of the respective roller and/or the body connected to the bearing of the respective roller.

8. The method according to claim 7, wherein the one or more non-contact distance measuring sensors are eddy current sensors, capacitive sensors or laser measuring devices.

9. The method according to claim 8, wherein the one or more non-contact distance measuring sensors are confocal laser measuring systems.

10. The method according to claim 6, wherein the determination of the position of the outer surface facing away from the material strip of the respective roller and/or of the body connected to the bearing of the respective roller is carried out at a plurality of points.

11. The method according to claim 10, wherein the determination of the position of the outer surface facing away from the material strip of the respective roller and/or of the body connected to the bearing of the respective roller is carried out in the region of the two ends of the respective roller.

12. The method according to claim 6, wherein the position of the outer surface facing away from the material strip of the first roller is determined for the detection of the relative positions of the rollers to one another.

13. The method according to claim 1, wherein for the detection of the relative positions of the rollers to one another, the position of a body connected to the bearing of at least one of the rollers is determined.

14. The method according to claim 13, wherein for the detection of the relative positions of the rollers to one another, the position of a body connected to the bearing of the first roller is determined.

15. A machine tool for carrying out the method according to claim 1, with a roller arrangement comprising at least one pair of rollers between which the material strip can be clamped and with which it can be advanced at intervals by rotating the rollers at intervals, and comprising devices for detecting, for each feed interval, the relative position of the rollers with respect to one another and the angle of rotation of at least one of the rollers.

16. The machine tool according to claim 15, wherein the machine tool is a punching press with a tool for producing stacks of sheets.

17. The method according to claim 1, wherein the material strip, the thickness of which is determined, is fed to a punching press with a tool for producing sheet metal stacks, and wherein the determined sheet metal thicknesses are used to determine the stack height.

18. The method according to claim 1, wherein the material strip is provided with pilot openings and the position of a pilot opening is determined in each case in order to detect the feed length of the material strip.

19. The method according to claim 18, wherein the position of the pilot opening is determined in each case in order to detect the feed length of the material strip via a line sensor.

20. The method according to claim 1, wherein the machine tool is a punching press.

21. The method according to claim 1, wherein the rollers are shiftable.

22. The method according to claim 4, wherein the axis of rotation of the second roller is stationary and the axis of rotation of the first roller is shiftable perpendicularly to the axis of rotation and perpendicularly to the direction of passage of the material strip.

23. A roller arrangement arranged for carrying out the method according to claim 1, comprising at least one pair of rollers between which the material strip can be clamped and with which it can be advanced at intervals by rotating the rollers at intervals, and comprising devices for detecting, for each feed interval, the relative position of the rollers with respect to one another and the angle of rotation of at least one of the rollers.

24. The roller arrangement according to claim 23, wherein the devices for detecting the relative position of the rollers to one another are designed such that the determination of the position of the outer surface facing away from the material strip of the respective roller and/or the body connected to the bearing of the respective roller and/or of the body connected to the bearing of the respective roller can take place at several points.

25. The roller arrangement according to claim 24, wherein the devices for detecting the relative position of the rollers to one another are designed such that the determination of the position of the outer surface facing away from the material strip of the respective roller and/or the body connected to the bearing of the respective roller and/or of the body connected to the bearing of the respective roller can take place in the area of the two ends of the respective roller.

26. The roller arrangement according to claim 23, wherein the devices for detecting the relative position of the rollers to one another are designed for determining the position of a body connected to the bearing of at least one of the rollers.

27. A feed apparatus with a roller arrangement according to claim 23.

28. The roller arrangement according to claim 23, wherein the devices for detecting the relative position of the rollers to one another are designed to determine the position of the outer surface facing away from the material strip of at least one of the feed rollers.

29. The roller arrangement according to claim 23, wherein the devices for detecting the relative position of the rollers to one another for determining the position of the outer surface facing away from the material strip of the respective roller and/or the body connected to the bearing of the respective roller have one or more non-contact distance measuring sensors.

30. The roller arrangement according to claim 29, wherein the one or more non-contact distance measuring sensors are eddy current sensors, capacitive sensors or laser measuring devices.

31. The roller arrangement according to claim 30, wherein the one or more non-contact distance measuring sensors are confocal laser measuring systems.

* * * * *